US006247822B1

(12) United States Patent
Jaklin et al.

(10) Patent No.: US 6,247,822 B1
(45) Date of Patent: Jun. 19, 2001

(54) REFLECTOR APPARATUS

(75) Inventors: Ralf Jaklin, Liederbach; Guenther Mumper, Weiterstadt, both of (DE)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/488,415

(22) Filed: Jan. 21, 2000

(30) Foreign Application Priority Data

Jan. 21, 1999 (GB) ........................................ 99101155

(51) Int. Cl.[7] ........................................ G02B 7/182

(52) U.S. Cl. ........................ 359/871; 359/883; 359/514; 359/515

(58) Field of Search ........................ 359/514, 515, 359/531, 532, 533, 543, 544, 545, 546, 547, 548, 549, 551, 552, 838, 846, 847, 871, 883

(56) References Cited

U.S. PATENT DOCUMENTS

| | | | | |
|---|---|---|---|---|
| 1,959,055 | * | 5/1934 | Jeffery et al. | 359/543 |
| 2,255,748 | * | 9/1941 | Haggart, Jr. | 359/514 |
| 2,627,784 | * | 2/1953 | Pellar | 359/531 |
| 3,063,343 | * | 11/1962 | Kaestner | 359/848 |
| 3,441,336 | * | 4/1969 | Gunderson | 359/533 |
| 3,563,638 | * | 2/1971 | Panozzo | 359/864 |
| 5,014,174 | * | 5/1991 | Won et al. | 359/883 |
| 5,143,338 | * | 9/1992 | Eberlin . | |
| 5,247,395 | * | 9/1993 | Martinez | 359/883 |

* cited by examiner

*Primary Examiner*—Ricky D. Shafer

(57) ABSTRACT

A reflector apparatus with a reflector, in particular a parabolic mirror, with a plastic layer, on which a plastic sheet with a metal structure is provided, and with a casing consisting of two hollow cylinders which can be arranged inside one another and between which the reflector is held is provided, wherein the reflector comprises a further plastic layer which forms a substantially hollow cylindrical collar on the edge of the reflector and wherein this collar is held between the hollow cylinders of the casing.

10 Claims, 3 Drawing Sheets

REFLECTOR APPARATUS

BACKGROUND OF THE INVENTION

1. Field of the Invention

This application relates to a reflector apparatus, in particular a parabolic mirror, with a plastic layer on which a plastic sheet with a metal structure is provided and with a casing consisting of two hollow cylinders which can be arranged inside one another and between which the reflector is held.

2. Description of the Prior Art

Reflectors or transreflectors are used for many applications, in particular for the orientation of radar waves. It is already known to produce reflectors for radar applications where a plastic sheet is coated with a metal, in particular aluminum, the plastic sheet is fixed in an injection moulding die and is then overfed with a plastic layer having the necessary shape, for example a parabolic shape. A parabolic mirror is thus formed which is arranged relative to a radar source by a casing. In many cases, this casing consists of a metal, for example of aluminum. A casing of this type can be produced as a cast casing.

It is also known to fix the parabolic mirror in the cast casing between an outer cylinder and an inner cylinder with a seal inserted in-between. In an outer hollow aluminum cylinder having a peripheral, inwardly orientated flange, a seal is placed against this flange, the reflector is subsequently introduced that is followed by an inner cylinder which presses the reflector and the seal against the flange of the outer cylinder.

It has been found that pronounced deformation of the components may occur owing to the different coefficients of thermal expansion of the casing and the reflector. Owing to this deformation, a precise orientation in the radial direction of the reflector relative to the radar transmitter is no longer ensured. As the centrality of the reflector relative to the transmitter is very important for applications where safety is paramount, it is necessary not only to accommodate production tolerances with a reflector apparatus consisting of reflector and casing but also to accommodate for the differing thermal expansion of the various components.

SUMMARY OF THE INVENTION

Starting from this state of the art, it is an object of the present invention to provide a reflector arrangement which ensures a defined position of the parabolic mirror over a predetermined temperature range. A further object of the invention is to provide a process for producing a reflector arrangement of this type.

The reflector arrangement according to the invention comprises a reflector with a first plastic layer on which a plastic sheet with a metal structure is provided and a further plastic layer which forms a substantially hollow cylindrical collar at the edge of the reflector as well as a casing which consists of two hollow cylinders adapted to be arranged inside one another, the collar of the second plastic layer being held between the hollow cylinders of the casing. As the collar of the reflector is fixed at the end remote from the reflector and the edge of the reflector is not fixed directly between the hollow cylinders, stresses between collar and hollow cylinders owing to differing thermal expansion have only a slight effect on the reflector itself.

The hollow cylinders and the plastic layers of the reflector are produced from different materials. These different materials also have different coefficients of thermal expansion, which results in differing expansion of casing and reflector. As the hollow cylindrical collar is accommodated between the hollow cylinders of the casing, the differing expansion of these components has to be absorbed. It is particularly advantageous to provide the collar with substantially axially extending slots which are distributed along the periphery, for example by milling material from the collar in these slots. If the collar and the hollow cylinders expand to different extents, this variation can be absorbed by the slots so that excessive stresses are avoided.

A further particular advantage is that catch fingers are arranged on the collar between the hollow cylinders for defined fastening of the collar. These catch fingers each comprise a catch projection and are also distributed along the periphery of the collar. They are separated from the collar by axially extending slots.

A further particular advantage is that one of the hollow cylinders includes a shoulder behind which the catch projection engages and that the second hollow cylinder comprises a stop for the edge of the collar. The position of the collar relative to the hollow cylinders is therefore defined in the axial direction.

It is also particularly advantageous to provide a resilient element which is part of the collar and is fixed between the shoulder and the stop of the hollow cylinders. This resilient element serves to compensate for production tolerances between the two hollow cylinders and the reflector.

It is also particularly advantageous to provide ribs on the collar which are deformed as the collar is inserted between the hollow cylinders of the casing. These ribs also serve to compensate for production tolerances.

It is also further advantageous to provide these ribs on the catch fingers, as this ensures that the catch fingers are fixed securely between the two hollow cylinders whereas the region between the catch fingers, which are separated from the catch fingers by slots, can shift between the two hollow cylinders of the casing if necessary due to different thermal expansion.

A further particular advantage is that a radially extending peripheral flange is provided outside the collar at the edge of the reflector. This flange serves as a seal seat for a seal that is arranged between the outer hollow cylinder and the collar and flange of the reflector. This is advantageously a low-pressure seal which does not exert a great force on the collar of the reflector and is able to absorb differing thermal expansions. A part of the seal is also located between the flange and the outer hollow cylinder. A rib, which serves to fasten the reflector on the outer hollow cylinder so it is sealed against contaminants such as spray water, is provided on the outer hollow cylinder in this region.

With the arrangement according to the invention, the production tolerances of the different components can be allowed for and it is also ensured that differing thermal expansion is compensated so that the variations in the centrality of the reflector arrangement lie within the permitted tolerances despite this differing thermal expansion.

BRIEF DESCRIPTION OF THE DRAWINGS

FIG. 5 is a perspective view of the reflector.

DETAILED DESCRIPTION OF THE PREFERRED EMBODIMENT

Figure 1:
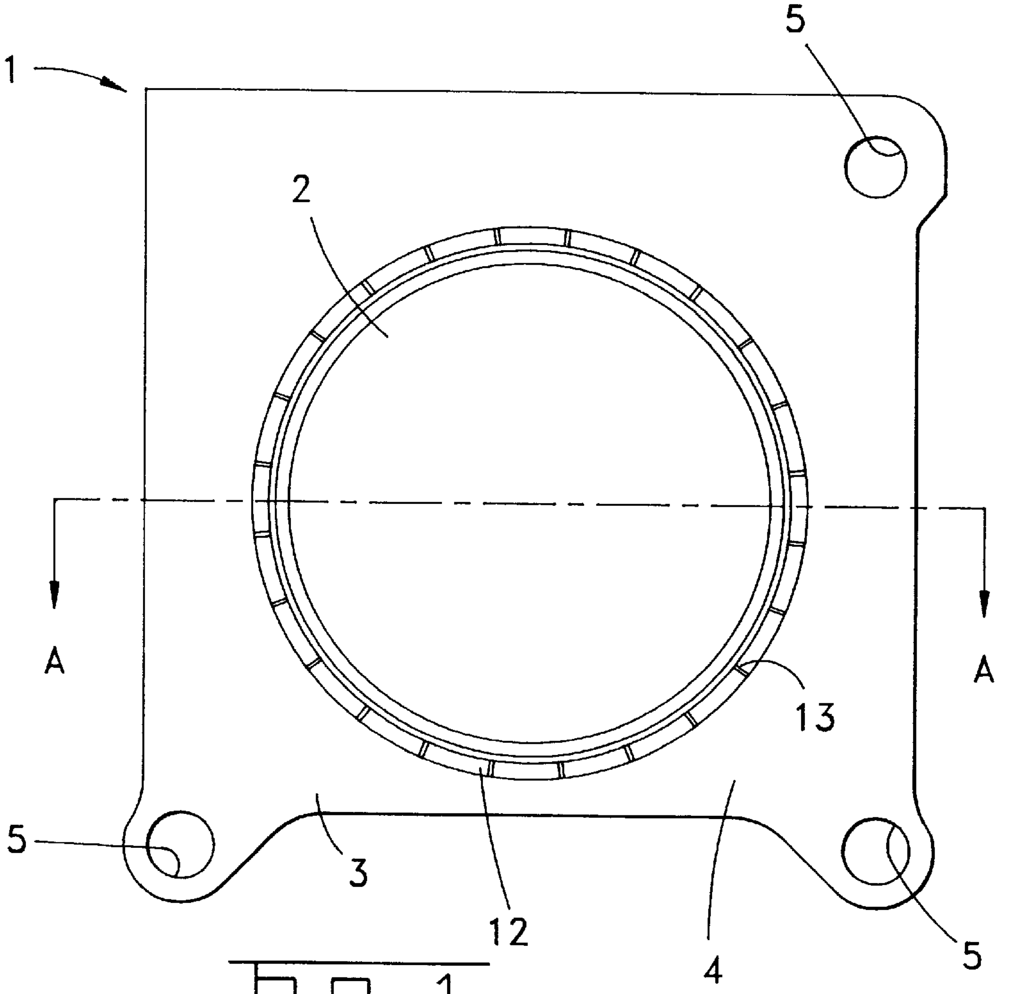
FIG. 1 is a plan view of the reflector arrangement with reflector and casing.
Figure 2:
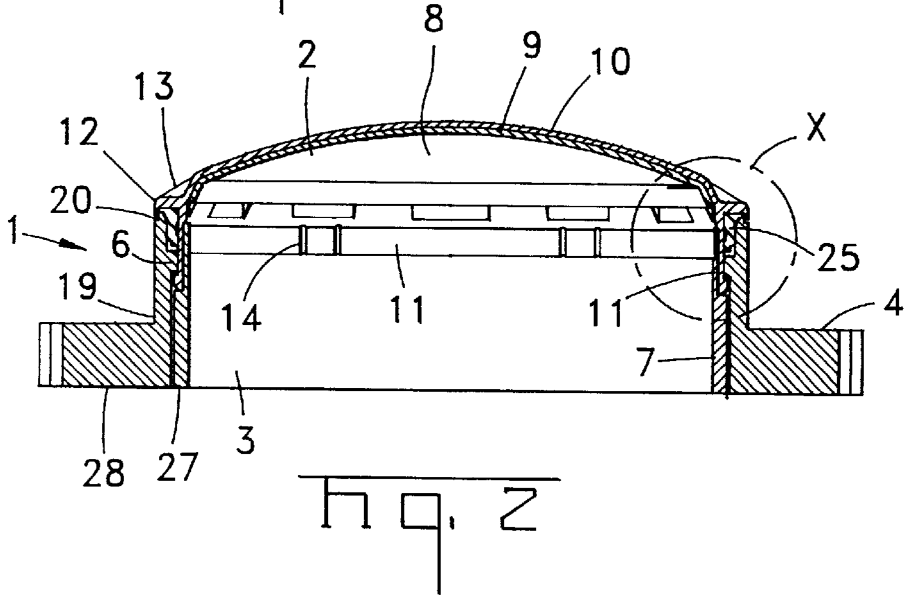
FIG. 2 is a cross-section through the reflector arrangement along line A—A of FIG. 1.
Figure 3:
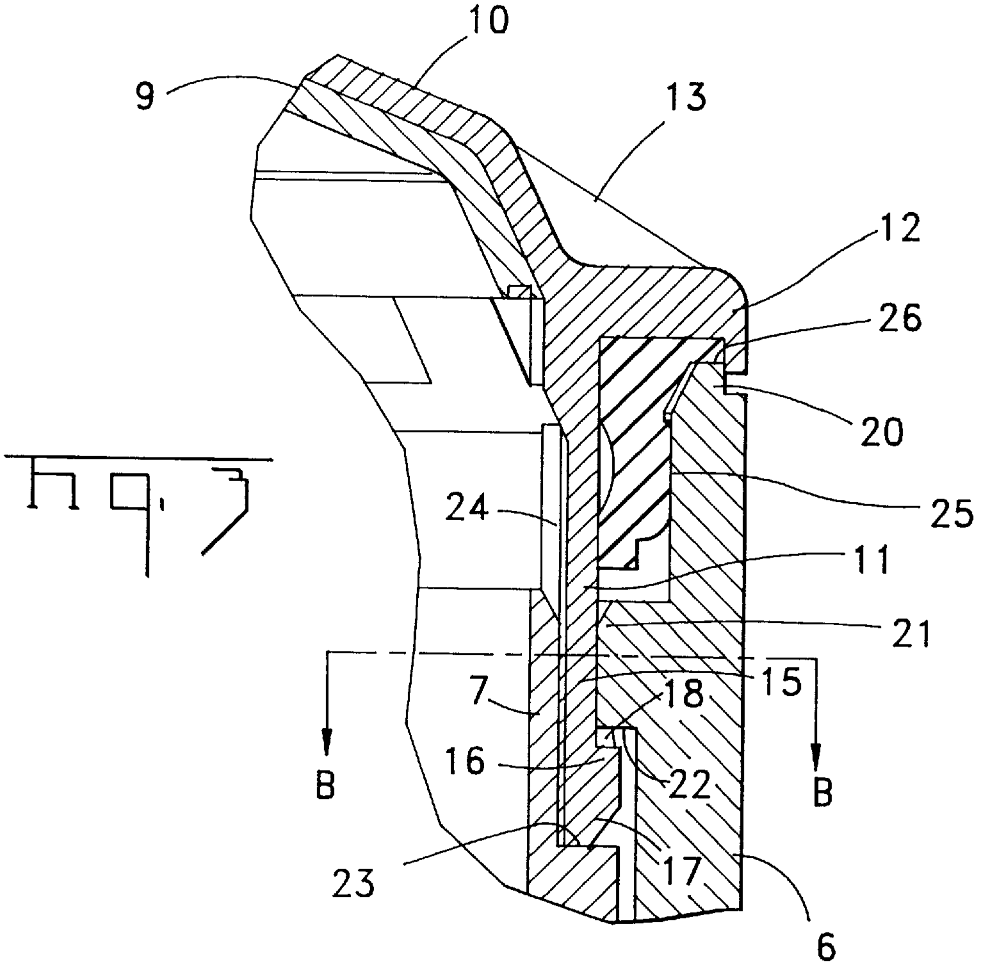
FIG. 3 shows an enlargement of Detail X of the reflector arrangement, as shown in FIG. 2.
Figure 4:
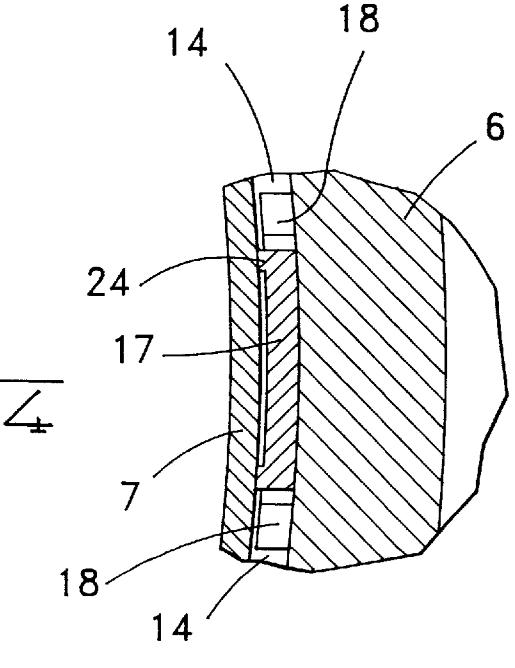
FIG. 4 shows an enlarged partial cross-section of the reflector arrangement along line B—B of FIG. 3.
Figure 7:
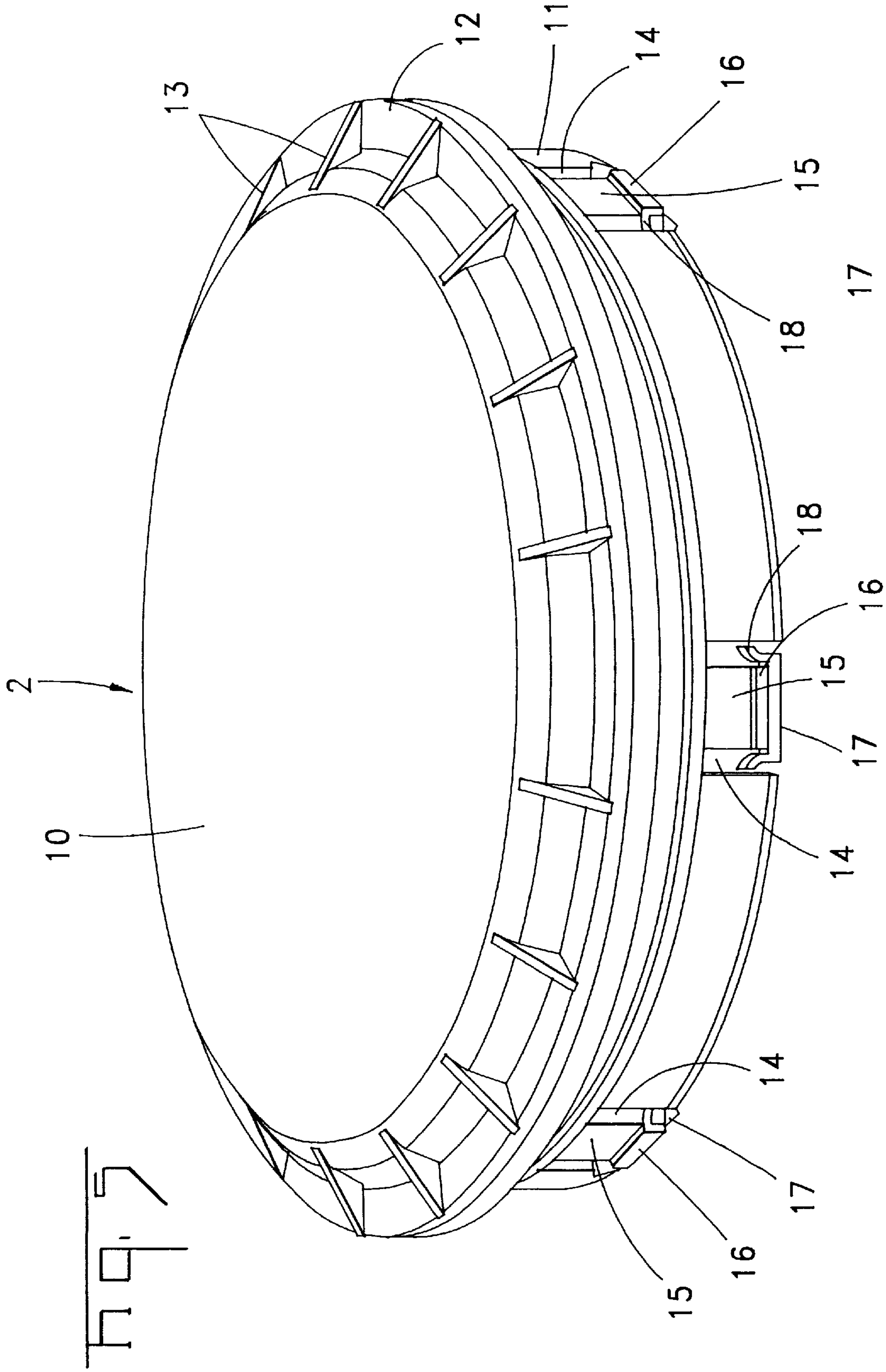

An embodiment of the invention will now be described with reference to FIGS. 1 through 5. FIG. 1 is a plan view of the reflector arrangement 1. FIG. 2 is a corresponding section along line A13 A in FIG. 1. The reflector arrangement consists of a reflector 2 and a casing 3. The casing 3 is used for mounting the reflector on a plate which carries, for example, the electronic components and also a transmitter, for example for radar waves. The reflector 2 is to be orientated relative to this transmitter by means of the casing 3. The reflector 2 can be, for example, a parabolic mirror or a transreflector of the type used, for example, in radar systems. For mounting the casing 3, the casing 3 has a mounting flange 4 with holes 5 for fastening to a plate. The mounting flange 4 is formed integrally with an outer hollow cylinder 6 which is orientated with its axis perpendicular to the mounting flange 4. The casing 3 also comprises an inner hollow cylinder 7 which is located inside the outer hollow cylinder 6. It is particularly advantageous to use a cast casing 3 made of aluminum.

The reflector 2 comprises a plastic sheet 8 carrying a aluminum structure and is constructed as follows:

The plastic sheet is encapsulated in a first plastic layer 9 which gives the plastic sheet 8 its shape; This first plastic layer 9 is in turn overfed by a second plastic layer 10 where the second plastic layer 10 not only is located in the region of the first plastic layer 9, in other words of the actual reflector, but also has a hollow cylindrical collar 11 which adjoins the edge of the first plastic layer 9 and therefore of the actual reflector.

In addition to the hollow cylindrical collar 11, the reflector or the second plastic layer 10 also includes a peripheral flange 12 extending radially outside the collar 11. This flange 12 is connected to the outer plastic layer 10 of the reflector via individual ribs 13 which are arranged perpendicularly to the flange 12 and distributed along the periphery. The ribs 13 serve to stiffen and determine the angle between the flange 12 and the actual reflector.

The collar 11 of the reflector 2 includes a plurality of axially extending slots 14. The function of these slots would also be ensured if the slots were to extend obliquely to the axial direction. The slots 14 are distributed along the periphery of the collar 11 and are important for compensating for the different thermal expansion between the collar 11 and the inner and outer cylinders 6, 7 of the casing.

The collar 11 of the reflector 2 also comprises a plurality of catch fingers 15 which are distributed along the periphery. The catch fingers 15 are separated from the remainder of the collar 11 by the slots 14. The catch fingers 15 carry catch projections 16 projecting outwardly from the collar 11. The catch fingers 15 also comprise elastically resilient elements 18 extending outward from their free end 17.

The outer hollow cylinder 6 has a connected end 19 facing the mounting flange 4 and a free end 20. The outer cylinder 16 includes a peripheral rib 21 with a shoulder 22 orientated toward the connected end 19. The inner cylinder 7, on the other hand, comprises a stop 23 which is orientated toward the reflector when in the mounted state. Each catch arm 17 of the collar 11 comprises axially extending ribs 24 which are orientated inwardly.

The assembly and construction of the reflector arrangement is accordingly as follows. A low-pressure seal 25 is initially fastened on the reflector 2 between collar 11 and flange 4. The reflector is then pushed onto the outer cylinder 6 from above, in other words from the end of the casing 3 remote from the mounting flange. The catch fingers 15 with the catch hooks 16 are deflected over the peripheral rib 21 and catch behind the shoulder 22 of the outer cylinder 6. A space containing the low-pressure seal as is formed between the upper free end 20 of the outer cylinder 6 and the flange 12 of the reflector as well as the collar 11 of the reflector. This low-pressure seal 25 is preferably already located in a seal seat of the reflector 2 when the reflector 2 is mounted on the outer hollow cylinder 6. The low-pressure seal 25 prevents the seal from exerting direct pressure on the reflector while still ensuring a contaminant-tight connection between outer hollow cylinder 6 and flange 12. An additional rib 26, arranged at the free end 20 of the outer hollow cylinder 6, further improves the sealing effect.

Once the reflector is mounted on the outer hollow cylinder 6, the inner hollow cylinder 7 is inserted from the mounting side. The two hollow cylinders 6 and 7 are mounted relative to one another in such a way that the lower end face 27 of the inner hollow cylinder coincides with the mounting face 28 of the mounting flange 4. The catch fingers 15 strike the stop 23 of the inner hollow cylinder with their free end 17. The free ends 17 of the catch arms 15 with the elastic elements 18 are now fixed between the shoulder 22 of the outer hollow cylinder 6 and the stop 23 of the inner hollow cylinder 7. The resilient elements 18 serve to take up production tolerances between the two cylinders and the collar of the reflector. Production tolerances in the radial direction between the two cylinders are taken up by the ribs 24 on the catch fingers 15. These ribs are deformed during insertion of the second hollow cylinder to such an extent that a secure fit is produced between the catch fingers 15 and the hollow cylinders 6, 7.

If the radius of the hollow cylinders and of the collar vary to different extents, owing to thermal expansion, this will be compensated for by the slots 14. Whereas the catch fingers 15 are fixed securely between the hollow cylinders 6, 7, the other parts of the collar 11 are able to shift relative to one another due to the slots.

As a result of the particular design of the collar 11 of the reflector, the collar is bound in a defined manner between the inner hollow cylinder 7 and the outer hollow cylinder 6, production tolerances are allowed for and also differing thermal expansion of the components have been allowed for. The collar thus absorbs this differing thermal expansion without affecting the central position of the actual reflector.

The only thermal expansions which may still affect the position of the reflector are the axial thermal expansions by which the position of the reflector is changed in the axial direction. These expansions have been found not to have any significant effect, as the permitted tolerance is substantially greater than the sensitivity with respect to the centrality of the reflector.

What is claimed is:

1. Reflector apparatus comprising a reflector with a plastic layer on which a plastic sheet with a metal structure is provided and a casing having two hollow cylinders arranged inside one another and between which the reflector is held, characterised in that the reflector includes a further plastic layer that forms a cylindrical collar at the edge of the reflector and the collar is between the hollow cylinders of the casing.

2. The reflector apparatus according to claim 1, characterised in that the collar includes a plurality of catch fingers having a catch projection that are distributed along the periphery and are separated from the collar by axially extending slots.

3. The reflector apparatus according to claim 2, characterised in that one of the hollow cylinders of the casing includes a shoulder behind which the catch projection engages and in that the second hollow cylinder includes a stop for the edge of the collar.

4. The reflector apparatus according to claim 3, characterised in that the collar is provided with resilient elements fixed between the shoulder and the stop of the hollow cylinders.

5. The reflector apparatus according to claim 1, characterised in that the collar includes substantially axially extending slots which are distributed along the periphery.

6. The reflector apparatus according to claim 1, characterised in that the collar comprises ribs which are deformed as the collar is inserted between the hollow cylinders of the casing.

7. The reflector apparatus according to claim 1, characterised in that a radially extending peripheral flange is provided outside the collar at the edge of the reflector.

8. The reflector apparatus according to claim 7, characterised in that the flange is supported against the outer hollow cylinder of the casing.

9. The reflector apparatus according to claim 8, characterised in that a low-pressure seal is provided between the flange, the collar and the outer hollow cylinder.

10. The reflector apparatus according to claim 8, characterised in that the flange has a seal seat.

* * * * *